US012615681B2

(12) United States Patent
Fenton et al.

(10) Patent No.: US 12,615,681 B2
(45) Date of Patent: Apr. 28, 2026

(54) METHOD FOR TAILORING AN ACTIVATION STATE OF A PROTOCOL DATA UNIT SESSION AND TEST SYSTEM FOR TESTING A WIRELESS CONNECTION

(71) Applicant: Rohde & Schwarz GmbH & Co. KG, Munich (DE)

(72) Inventors: Mark Fenton, Fleet (GB); Andrew Naylor, Fleet (GB)

(73) Assignee: Rohde & Schwarz GmbH & Co. KG, Munich (DE)

( * ) Notice: Subject to any disclaimer, the term of this patent is extended or adjusted under 35 U.S.C. 154(b) by 248 days.

(21) Appl. No.: 18/459,064

(22) Filed: Aug. 31, 2023

(65) Prior Publication Data

US 2025/0081267 A1 Mar. 6, 2025

(51) Int. Cl.
*H04W 76/19* (2018.01)
*H04W 76/10* (2018.01)

(52) U.S. Cl.
CPC ........... *H04W 76/19* (2018.02); *H04W 76/10* (2018.02)

(58) Field of Classification Search
None
See application file for complete search history.

(56) References Cited

U.S. PATENT DOCUMENTS

| | | | |
|---|---|---|---|
| 2022/0124864 A1 | 4/2022 | Pham Van et al. | |
| 2022/0264518 A1 | 8/2022 | Da Silva et al. | |
| 2023/0097726 A1* | 3/2023 | Park | H04L 67/141 |
| | | | 370/392 |
| 2025/0048474 A1* | 2/2025 | Kim | H04W 76/30 |

FOREIGN PATENT DOCUMENTS

| | | | | |
|---|---|---|---|---|
| CN | 109661039 A | * | 4/2019 | H04L 43/18 |

OTHER PUBLICATIONS

Personal_computer_-_Wikipedia (Year: 2019).*
CN_109661039_A_I_English_translation (Year: 2019).*

* cited by examiner

*Primary Examiner* — Ayaz R Sheikh
(74) *Attorney, Agent, or Firm* — CHRISTENSEN O'CONNOR JOHNSON KINDNESS PLLC

(57) ABSTRACT

A method is disclosed for tailoring an activation state of a protocol data unit session between a test network and at least one user equipment. A test system for testing a wireless connection between at least one user equipment and a test network is also provided. The user equipment is registered with the test network. The protocol data unit session is established between the test network and the user equipment. The protocol data unit session between the test network and the user equipment is resumed after at least one radio resource control connection of the protocol data unit session between the test network and the user equipment was released once a release condition was met. The resuming is based on a resuming signal provided by a control device coupled to the test network such that an activation state of the protocol data unit session is modifiable.

20 Claims, 3 Drawing Sheets

METHOD FOR TAILORING AN ACTIVATION STATE OF A PROTOCOL DATA UNIT SESSION AND TEST SYSTEM FOR TESTING A WIRELESS CONNECTION

FIELD OF THE DISCLOSURE

The present disclosure generally relates to a method for tailoring an activation state of a protocol data unit session between a test network and at least one user equipment and a test system for testing a wireless connection between at least one user equipment and a test network.

BACKGROUND

For testing certain aspects of communications standards based functionalities of a user equipment (UE), such as a mobile phone or the like, an "active" communication connection with a network infrastructure is required (activation state of the communication is ON). For achieving an "active" communication connection, a registration process with the layer infrastructure underlying the communication connection and allowing protocol data unit sessions (PDU sessions) to be established is required to be achieved first. In essence, an "active" communication connection refers to an activated PDU session between the UE and the network. Each PDU session has one or more radio bearers assigned thereto. In this regard, a first layer of the layer infrastructure handles the registration procedure and the PDU session establishment. A second layer handles the underlying communication connection and the radio bearer establishment.

Once all aspects of the communication connection are established (activation state of the PDU session is ON), the PDU session and all bearers can be released if certain releasing conditions are met, such as a timeout condition. Once the PDU session is released, the activation state of the PDU session is OFF. In this regard, there is no reasonable possibility to prevent the UE from releasing the PDU session once a releasing condition is met. Put differently, the releasing is initiated automatically once the releasing condition is met and circumventing this automatism requires a substantial, unwanted modification of the underlying routines.

Prior art techniques at least require a data transfer between the UE and the layer infrastructure to occur for reestablishing the PDU session. This data transfer causes a load on the network which can be problematic in industrial testing environments such as within a facility environment used for manufacturing a large number of UEs which are at least partially tested simultaneously using a common test network (TN). Moreover, the data transfer also influences specific properties of the communication devices of the UEs themselves such that these do not have their "native" (unaffected) state. Corresponding test procedures of the communication functionalities of the UEs are thus more complex or may, in some cases, even be prevented.

The PDU sessions can also be reestablished without a specific data transfer based on a poll mode technique. Using this technique, the PDU session may be reestablished based on the polling frequency applied by the UEs. However, the polling frequency typically corresponds to poll periods of several minutes. Hence, this approach causes time delays for reestablishing the PDU sessions. These time delays are counterproductive in the above-indicated testing environments if the communications standard related functionalities of the UEs are to be tested. Thus, corresponding testing procedures are slowed down such that the overall time efficiency is reduced inducing enlarged testing costs as well.

Accordingly, there is a need for a method and a test system by means of which the disadvantages according to the prior art can be overcome or at least reduced.

In particular, a need exists for a technique based on which an activation state of a PDU session between a TN and at least one user equipment UE can be tailored as desired.

SUMMARY

A summary of certain embodiments disclosed herein is set forth below. It should be understood that these aspects are presented merely to provide a brief summary of these embodiments and that these aspects are not intended to limit the scope of this disclosure. This disclosure may encompass a variety of aspects that may not be set forth below. Some aspects as explained in view of methods, others in view of devices. However, the respective aspects are to be correspondingly transferred from methods to devices and vice versa.

Embodiments of the present disclosure relate to a method for tailoring an activation state of a protocol data unit (PDU) session between a test network (TN) and at least one user equipment (UE). In an embodiment, the method comprises registering at least one UE with the TN. The PDU session is (automatically) established between the TN and the at least one UE. In some embodiments, the PDU session is established between the TN and the at least one UE in an automatic fashion upon registering the at least one UE with the TN.

According to the method, the PDU session between the TN and the at least one UE device is resumed after at least one radio resource control (RRC) connection of the PDU session between the TN and the at least one UE was released, namely when at least one release condition was met. In other words, meeting the at least one release condition causes the at least one radio resource control (RRC) connection of the PDU session between the TN to be released. The resuming is based on a resuming signal provided by a control device (CD) coupled to the TN such that an activation state of the PDU session is modifiable.

The present disclosure is based on the fact that all PDU sessions are still remembered by the layer infrastructure and the UE such that the PDU sessions can be reestablished.

In some embodiments, the activation state of the PDU session is artificially modifiable. Therefore, the time period required for reestablishing the PDU session can be reduced as compared to known poll-based techniques. Consequently, the time efficiency can be improved. Thus, testing procedures which require an enabled activation state of the PDU session can be conducted within shortened time intervals. These advantages are achieved though no data transfer between the TN and the UE is required for reestablishing an activated PDU session. Hence, the load on the TN can be kept low or, in an alternative, can be lowered as compared to data transfer-based reestablishing techniques. Also, since no data transfer is required for reestablishing the PDU session, the communication interfaces of the UEs can be kept and tested according to their "native" (unaffected) state. Consequently, additional aspects of the UEs can be tested and the testing procedure is less complex compared to known procedures.

Some embodiments of the present disclosure relate to a test system for testing a wireless connection between at least one UE and a TN. In an embodiment, the at least one UE is configured to register with the TN. The TN is configured to (automatically) establish a PDU session between the TN and the at least one UE. The TN and/or the at least one UE are/is configured to release at least one RRC connection of the PDU session between the TN and the at least one UE once at least one release condition is met such that an activation state of the PDU session is altered. A CD coupled to the TN is configured to resume the PDU session between the TN and the at least one UE device based on a resuming signal such that the activation state of the PDU session is modifiable.

The advantages obtained by the before-mentioned method are readily achieved by the test system as well. In some embodiments, the PDU session is artificially reactivatable by a resuming signal of the CD. Accordingly, an unwanted time delay and/or data transfer can be avoided.

Optionally, the at least one RRC connection is established, for example by the TN, between the at least one UE and the TN upon registering the at least one UE with the TN. Accordingly, establishing of the RRC connection is a direct consequence of the registration procedure and may be considered an automatism in this regard. Put differently, no additional measures are required for the RRC connection to be established subsequent to registering the UE with the TN.

In some embodiments, at least one radio bearer (RB) is established, for example by the TN, in view of the at least one RRC connection between the TN and the at least one UE upon establishing the PDU session between the TN and the at least one UE. The at least one RB is released, for example by the TN and the at least one UE, when releasing the at least one RRC connection between the TN and the at least one UE. The at least one RB is recoverable, for example by the CD, based on the resuming signal.

Put differently, the RB is (automatically) established if the PDU session is established. In this regard, the RB is assigned to a corresponding RRC connection. Once the RRC connection is released, the RB is released as well. However, based on the resuming signal of the CD not only the PDU session but as well the RB is recoverable. The RB represents a service for quality of service compliance.

In some embodiments, the at least one RRC connection is recoverable based on the resuming signal. In some embodiments, the RRC connection is recoverable by the CD. Hence, the resuming signal serves multiple services, namely, recovering the RRC connection and resuming the PDU session. Advantageously, only a single signal is required for both purposes.

In some embodiments, the CD is configured to establish the TN. Thus, the CD may serve as a base station of the TN.

In some embodiments, the CD is a tester or a test device. Put differently, the tester or test device is a device in charge of enabling a testing procedure as indicated herein to be performed.

Optionally, the resuming signal is caused by a user input received via at least one human-machine-interface (HMI) of the CD. Hence, based on the HMI, the resuming signal may be artificially initiated at a desired point in time. Accordingly, any time delays may be shortened as desired.

In some embodiments, the HMI is part of the CD and is configured to receive a user input. Therefore, the CD is not only enabled to implement the TN but also to receive the corresponding command for resuming the PDU session.

Moreover, the CD may be configured to initiate the resuming signal based on the user input received via the at least one HMI. Consequently, all required functions for resuming the PDU session as well as for reestablishing the RB are executable by the CD.

In some embodiments, the at least one HMI comprises at least one button, at least one graphical user interface, at least one screen, or at least one standard commands for programmable instruments interface for receiving the user input. Hence, several different convenient implementations for receiving a command for initiating the resuming signal are considered.

Optionally, the PDU session is established, for example by the TN, between the at least one UE and at least one core network node of the TN via a non-access stratum (NAS). The core network node provides the highest level of aggregation which, thus, can be utilized by the UE for communication purposes.

In some embodiments, the release condition comprises at least one of a timeout condition of a timer comprised with the at least one UE or the CD. The timer can be an intrinsic function of the communication protocols implemented by the UE and the CD, for example the UE.

Optionally, initiation of the timer may depend on whether certain communication procedures are utilized between the UE and the TN. Therefore, release of the RRC connection as a consequence of the timer cannot be omitted on a regular basis. However, the PDU session which is deactivated when releasing the RRC connection, can be recovered as desired based on the resuming signal though the timer is present.

Optionally, the release condition is met if no data is transmitted between the TN and the at least one UE for a time period exceeding a predetermined time limit. As a data transfer is presently unwanted, the timer so configured cannot be prevented per se. However, the disadvantages caused by the timer can be remedied as explained above.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
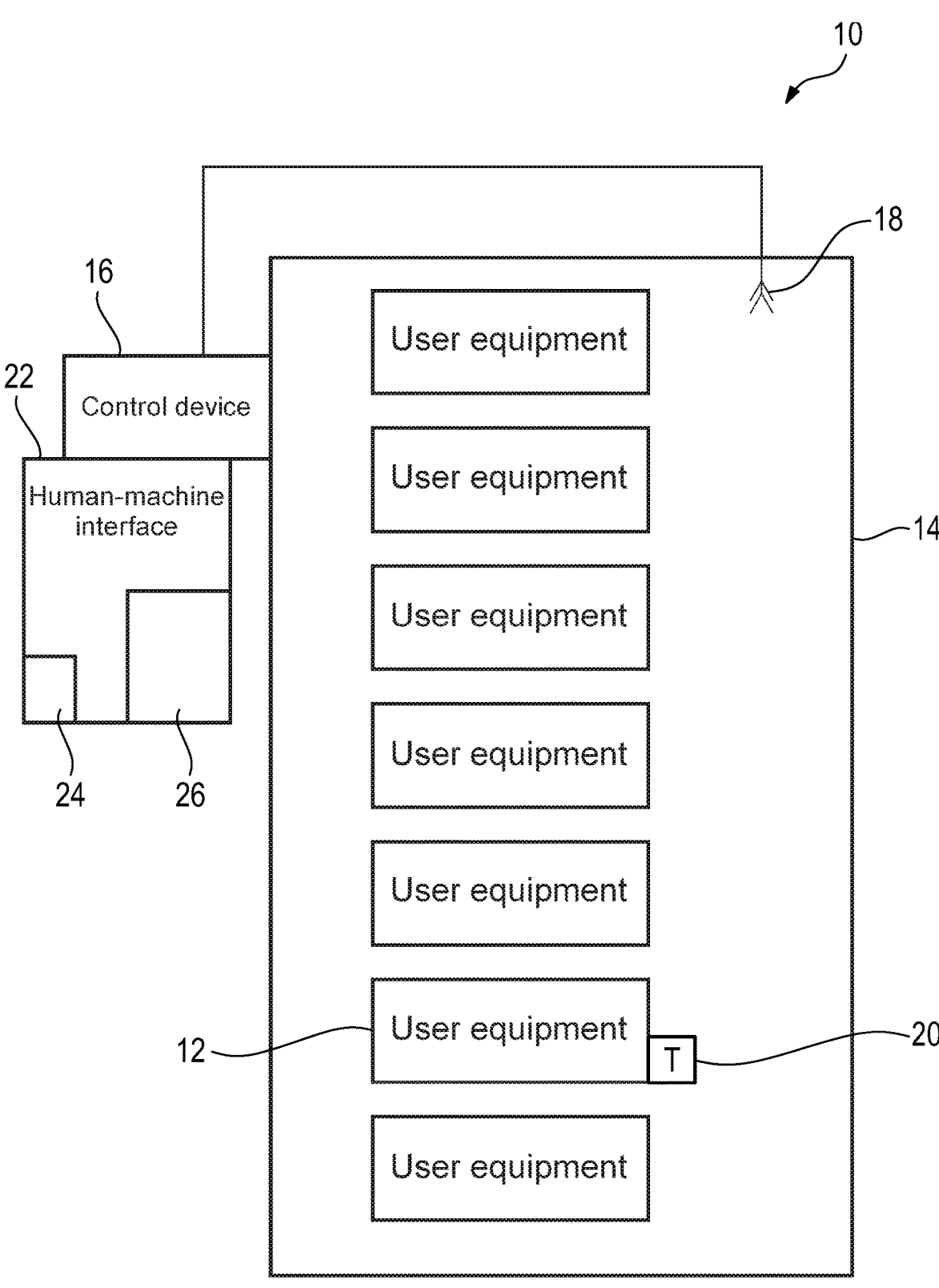
FIG. 1 is a schematic drawing of a test system for testing a wireless connection between a UE and a TN according to an embodiment.

FIG. 1 is a schematic drawing of a test system 10 for testing a wireless connection between a user equipment (UE) 12 and a test network (TN) 14 according to an embodiment. In this example, multiple UEs 12 are provided and generally supposed to be used with the TN 14.

In some embodiments, the TN 14 is set up for testing communication functionalities of the UEs 12. In some embodiments, the TN 14 utilizes a specific wireless mobile communications standard, such as 5G, LTE (Long Term Evolution), or 6G.

Optionally, the connection between the UE 12 and the TN 14 relies on a communication between the UE 12 and a base station of the TN 14. The base station of the TN 14 can be configured to transmit and/or receive a wireless signal according to a communication standard utilized by the TN 14.

In the embodiment shown in FIG. 1, the test system 10 comprises a control device (CD) 16. The CD 16 includes circuitry configured to establish the TN 14, i.e. the CD 16 is in control of the TN 14. In this regard, the CD 16 is coupled with an antenna 18 configured to transmit and/or receive corresponding radio signals. Hence, the CD 16 functions as a base station of the TN 14.

Generally, a radio communication connection can be established between the UE 12 and the TN 14. During the course of this radio communication connection a protocol data unit session (PDU session) is established, which will be explained later in greater detail.

In principle, each UE 12 comprises a timer 20. The timer 20 initiates a counting process based on whether or not a data transfer occurs between the UE 12 and the TN 14. If the timer 20 reaches a predetermined counting threshold value corresponding to a predetermined time limit, a release condition is met regarding the PDU session. In this event, the timer 20 is configured to initiate a release signal based on which an RRC connection of the PDU session between the UE 12 and the TN 14 is released. In effect, the activation state of the PDU session is modified from ON to OFF, i.e. the PDU session of the connection between the UE 12 and the TN 14 is deactivated based on the release signal.

Still referring to FIG. 1, the test system 10 comprises a human-machine-interface (HMI) 22 which is coupled to the CD 16. The HMI 22 comprises inputs/outputs, such as button 24 and a screen 26. Different implementations such as a HMI 22 having a touchscreen can also be contemplated.

In some embodiments, the HMI 22 is configured to output visual data, which may indicate certain properties of the CD 16 and/or the TN 14. For example, the visual data may indicate an activation state of a specific PDU session regarding a specific UE 12.

In some embodiments, the HMI 22 is configured to receive a user input, e.g. via the button 24. Based on the user input, a resuming signal may be initiated which leads to resuming of the PDU session between the specific UE 12 and the TN 14.

Figure 2:
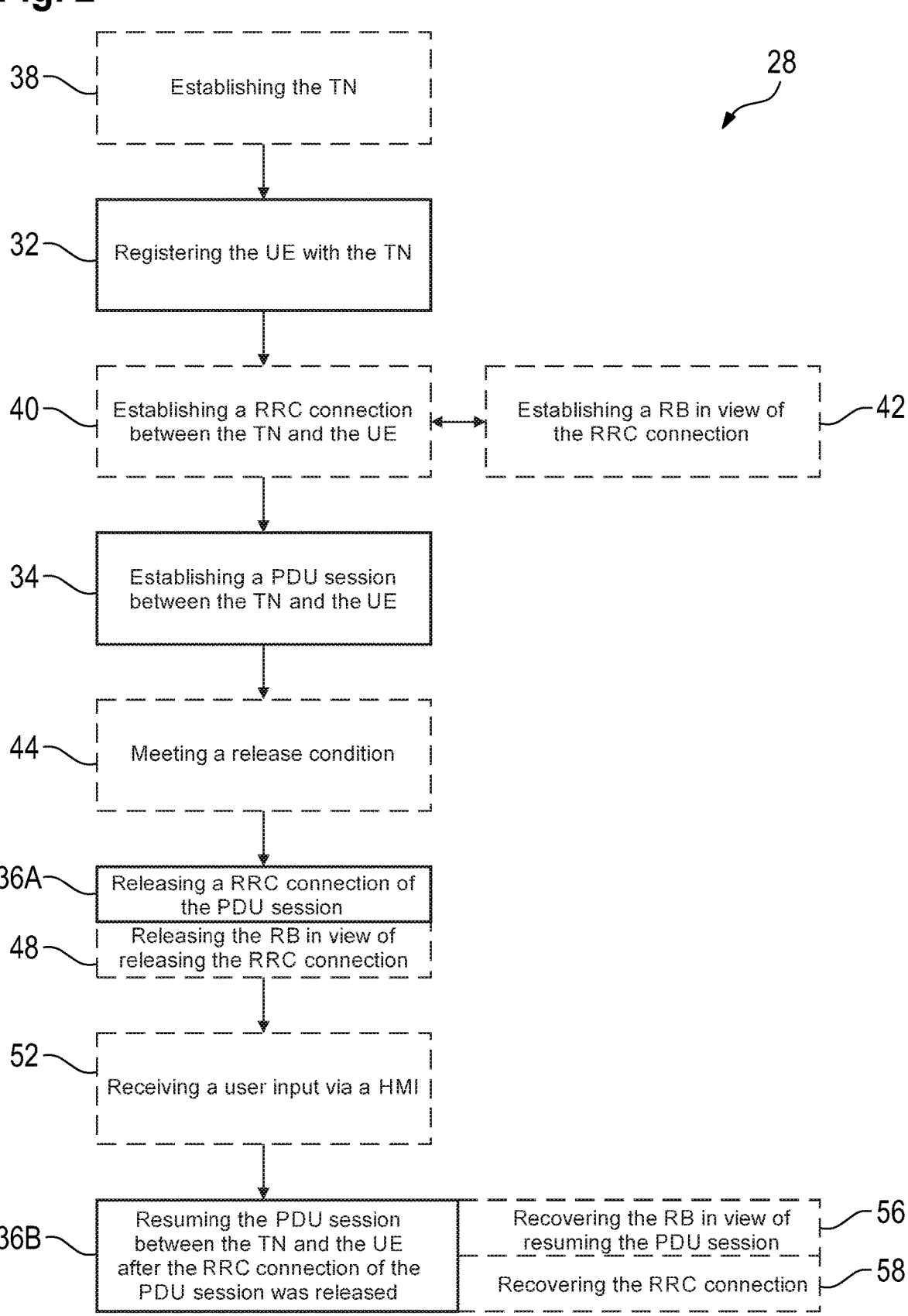
FIG. 2 is a schematic drawing of a method for tailoring an activation state of a PDU session between a TN and a UE according to an embodiment.
Figure 3:
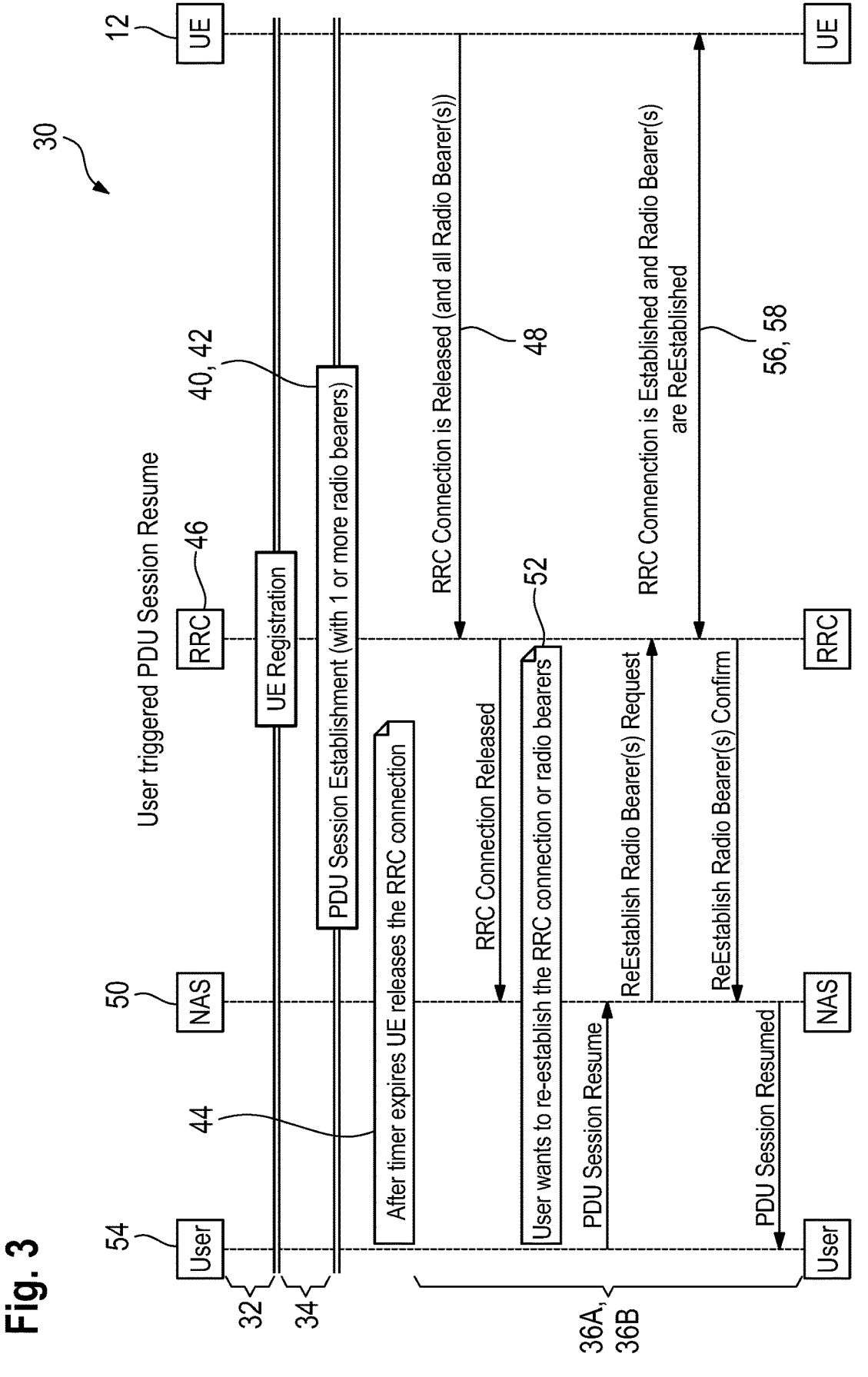
FIG. 3 is a schematic drawing of a representative layer infrastructure underlying the communication connection of the wireless connection between a UE and a TN.

FIG. 2 is a schematic drawing of a method 28 for tailoring an activation state of a PDU session between a TN 14 and a UE 12 according to an embodiment. Optional steps are shown in dashed lines. FIG. 3 is a schematic drawing of a representative layer infrastructure 30 underlying the communication connection of the wireless connection between a UE 12 and a TN 14. Within the layer infrastructure 30, the actions corresponding to specific steps of the method 28 are indicated using like reference signs.

In step 32, the UE 12 in question is registered with the TN 14. The registering procedure can be initiated by native functionalities includes with the UE 12. For example, the registering procedure can be automatically initiated once the UE 12 is powered on.

In step 34, the PDU session between the TN 14 and the UE 12 is (automatically) established. Put differently, establishing the PDU session between the UE 12 and the TN 14 is a direct consequence of the registering procedure indicated in step 32.

In this regard, The PDU represents a single unit of information transmitted among peer entities of a computer network, here the wireless TN 14. The entities comprise at least the UE 12. The PDU session is composed of protocol-specific control information and UE data.

Once the registration procedure is completed and the PDU session was activated once, the PDU session is established permanently as to the session per se. However, the activation state of the PDU session can be ON (activated PDU session) or OFF (deactivated PDU session). For an activated PDU session, the RRC connection of the PDU session is established. For a deactivated PDU session, the RRC connection of the PDU session is released.

Step 36 can be considered to be split into two substeps 36A, 36B. According to substep 36A, a RRC connection of the PDU session between the TN 14 and the UE 12 is released once at least one release condition is met. As a consequence, the activation state of the respective PDU session turns from ON to OFF. Substep 36A can be considered to not be "actively" performed or initiated by some component of the test system 10. Rather, meeting of the release condition leads to a release signal which can be regarded an unwanted but unavoidable consequence of specific control procedures being performed by some of the devices of the test system 10 within the course of the communication procedure.

In substep 36B, the PDU session between the TN 14 and the UE 12 is resumed based on a resuming signal after the RRC connection of the PDU session was released. The resuming signal is provided by the CD 16 coupled to the TN 14 such that an activation state of the PDU session is modifiable.

The method 28 can be modified based on one or multiple optional steps. For example, according to optional step 38, the TN 14 is established prior to step 32. In this regard, the CD 16 may be utilized to establish the TN 14, e.g. via the antenna 18. As to the HMI 22 coupled to the CD 16, establishing of the TN 14 can also be initiated based on a user input received via the HMI 22. Upon registering the UE 12 with the TN 14, the method 28 can also comprise optional step 40 following step 32 according to which at least one RRC connection is established between the UE 12 and the TN 14.

The RRC connection is based on a protocol (RRC protocol) which is used in specific communication standards, such as UMTS, LTE, 5G, 6G, and on the air interface. It is a layer-3 (network layer) protocol used between a UE 12 and a base station of the underlying network, here the TN 14. This protocol is specified by the 3GPP ($3^{rd}$ Generation Partnership Project), the disclosure of which is incorporated by reference in its entirety. The major functions of the RRC protocol include connection establishment and release functions, broadcast of system information, radio bearer establishment, reconfiguration and release.

The operation of the RRC connection is guided by a state machine implemented within the course of the RRC protocol which defines certain specific states that a UE 12 may be present in. The different states in this state machine have different amounts of radio resources associated with them and these are the resources that the UE 12 may use when it is present in a given specific state. Since different amounts of resources are available at different states, the quality of the service (provided by the TN 14 within the course of the RRC connection) that the UE 12 experiences and the energy consumption of the UE 12 are influenced by this state machine. Test procedures may be employed to evaluate these and other aspects of the underlying communication connection between the UE 12 and the TN 14. However, as already indicated before, such test procedures require activated PDU sessions between the UE 12 and the TN 14.

In some embodiments, the method 28 may be altered by optional step 42, according to which at least one RB is established in view of the at least one RRC connection between the TN 14 and the UE 12 upon establishing the PDU session between the TN 14 and the UE 12.

The RB (sometimes also called radio access bearer) is a UMTS service (Universal Mobile Telecommunications System service) for quality of service (QOS) compliance. This radio access channel is used to ensure QoS for a communication at a subscriber level between the UE 12 and the TN 14.

According to optional step 44 following step 34, a release condition is met. Meeting of the release condition can e.g. be based on the timer 20 of the UE 12 which exceeds a predetermined counting threshold as to a missing data transfer between the UE 12 and the TN 14. In consequence of meeting the release condition, a release signal is initiated, e.g. by the timer 20 of the UE 12. Hence, the release signal of the UE 12 acts on the RRC layer 46 of the layer infrastructure 30, see FIG. 3.

Based on the release signal of the UE 12, the RRC connection of the PDU session in question between the UE 12 and the TN 14 is released in substep 36A.

Within the course of step 36A, the method 28 may also comprise optional step 48 according to which the RB is released when releasing the at least one RRC connection between the TN 14 and the UE 12. Releasing of the RB is handled by the RRC layer 46 of the layer infrastructure 30 within the course of the radio connection between the UE 12 and the TN 14.

Releasing of the RRC connection of the PDU session and the RB acts on the NAS layer 50 of the layer infrastructure 30, as shown in FIG. 3. In this regard, the NAS layer 50 enables the PDU session to be established between the UE 12 and a core network node of the TN 14. Furthermore, the NAS layer 50 also handles the registration procedure of the UE 12 with the TN 14 and the initial establishment of the PDU session within the course of this registration procedure.

Generally speaking, a core network node provides the highest level of aggregation in a service provider network, here the TN 14. Moreover, in telecommunications networks, especially in UMTS and LTE (Long Term Evolution) networks, the NAS layer 50 is a functional layer which stacks between the network, here the TN 14, and the UE 12. The NAS layer 50 generally allows a data transfer dialogue to be executed between the core nodes of the TN 14 and UE 12. To the contrary, the access stratum allows a data transfer dialogue between the TN 14 per se (but not necessarily the core nodes) and the UE 12. Since the entire communication capabilities of the UEs 12 are to be tested, a NAS layer 50 is considered in this regard. Therefore, the PDU session is established such that the UE 12 may make use of the high levels of aggregation provided by the core nodes of the TN 14. Consequently, such "deep-formed" communication connections may also be tested during the herein-indicated testing procedures.

As according to steps 36A and 48 the RRC connection and the RB are released, as the PDU session is released in the course of these steps as well (activation state of the PDU session turned to OFF), and since these releasements act on the NAS layer 50, an active communication between the UE 12 and the TN 14, especially the core network nodes thereof, is prevented. In this regard, releasing of the PDU session can be indicated to a user, e.g. via the screen 26 of the HMI 22 coupled to the CD 16.

The method 28 may also comprise the optional step 52 prior to step 36B according to which the test system 10 receives a user input, e.g. via the button 24 of the HMI 22. FIG. 3 indicates the user input based on a user layer 54 of the layer infrastructure 30. Based on the user input a resuming signal is initiated. Put differently, the resuming signal is user triggered. The resuming signal acts on the NAS layer 50 of the layer infrastructure 30.

In the course of the resuming signal, the NAS layer 50 of the layer infrastructure 30 initiates a request to reestablish the RB. The request is provided to the RRC layer 46 of the layer infrastructure 30, as shown in FIG. 3.

In some embodiments, this leads to optional steps 56 and 58 in the course of substep 36B of the method 28. According to optional steps 56 and 58, the RB and the RRC connection between the RRC layer 46 and the UE 12 are recovered based on the resuming signal.

According to FIG. 3, recovering of the RB and the RRC connection between the UE 12 and TN 14 is confirmed where a confirmation message is provided from the RRC layer 46 to the NAS layer 50 of the layer infrastructure 30. As a consequence, the PDU session is resumed by the NAS layer 50 within the course of substep 36B, i.e. the activation state of the PDU session is turned from OFF to ON.

According to the layer infrastructure 30, resuming of the PDU session is indicated to a user via a confirmation massage, which e.g. can be outputted via the HMI 22.

Therefore, the activation state of the PDU session between the UE 12 and the TN 14 can be influenced based on the resuming signal.

The resuming of the PDU session is achieved by adapting only the TN 14, i.e. the underlying layer infrastructure 30. No dedicated commands provided to the UE 12 are required in this regard. Although the PDU session is resumed as if a data transfer occurred between the UE 12 and the TN 14, the resuming signal is provided without any data actually being sent between the UE 12 and the TN 14. This means that no data transfer between the UE 12 and the TN 14 is required for resuming the PDU session. Therefore, the load on the TN 14 is kept low.

In some embodiments, via the user input the resuming signal can be initiated at desired points in time. For example, the resuming signal can be initiated shortly after the corresponding PDU session has been deactivated. Therefore, time delays due to deactivated PDU sessions can be avoided or at least be reduced.

In essence, as method 28 enables the activation state of the PDU session to be modified, the UE 12 can be tested efficiently with regard to its communication functionalities employing test routines.

Certain embodiments disclosed herein include systems, apparatus, components, etc., that utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry." "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

For example, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implemented the functionality described herein.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a graphical processing unit (GPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In some embodiments, one or more of the components described herein include circuitry programmed to carry out one or more steps of any of the methods disclosed herein. In some embodiments, one or more computer-readable media associated with or accessible by such circuitry contains instructions embodied thereon that, when executed by such circuitry, cause the component or circuity to perform one or more steps of any of the methods disclosed herein or set forth in the claimed subject matter.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein. All such combinations or sub-combinations of features are within the scope of the present disclosure.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near." etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C." for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this disclosure, the same or similar elements may bear the same references. Furthermore, the presence of reference numbers or letters in the drawings cannot be considered limiting, even when such numbers or letters are indicated in the claims.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for tailoring an activation state of a protocol data unit session between a test network and at least one user equipment, wherein the method comprises at least the steps of:
   registering the at least one user equipment with the test network,
   establishing the protocol data unit session between the test network and the at least one user equipment,
   resuming the protocol data unit session between the test network and the at least one user equipment after at least one radio resource control connection of the protocol data unit session between the test network and the at least one user equipment was released once at least one release condition was met, wherein the resuming is based on a resuming signal provided by a control device coupled to the test network such that an activation state of the protocol data unit session is modifiable, and
   wherein resuming is based on all protocol data unit sessions being stored within a layer structure of the test network subsequent to the respective protocol data unit sessions being established once.

2. The method according to claim 1, wherein the at least one radio resource control connection is established between the at least one user equipment and the test network upon registering the at least one user equipment with the test network.

3. The method according to claim 1, wherein at least one radio bearer is established in view of the at least one radio resource control connection between the test network and the at least one user equipment upon establishing the protocol data unit session between the test network and the at least one user equipment,
   wherein the at least one radio bearer is released when releasing the at least one radio resource control connection between the test network and the at least one user equipment, and
   wherein the at least one radio bearer is recoverable based on the resuming signal.

4. The method according to claim 1, wherein the at least one radio resource control connection is recoverable based on the resuming signal.

5. The method of claim 1, wherein the control device is configured to establish the test network.

6. The method according to claim 1, wherein the resuming signal is caused by a user input received via at least one human-machine-interface of the control device.

7. The method according to claim 6, wherein the at least one human-machine-interface comprises at least one button, at least one graphical user interface, at least one screen, or at least one standard commands for programmable instruments interface for receiving the user input.

8. The method according to claim 1, wherein the protocol data unit session is established between the at least one user equipment and at least one core network node of the test network via a non-access stratum.

9. The method according to claim 1, wherein the release condition comprises at least one of a timeout condition of a timer comprised with the at least one user equipment or the control device.

10. The method according to claim 1, wherein the release condition is met if no data is transmitted between the test network and the at least one user equipment for a time period exceeding a predetermined time limit.

11. A test system for testing a wireless connection, comprising:
   at least one user equipment and a test network, wherein the at least one user equipment includes circuitry configured to register with the test network, and wherein the test network includes circuitry configured to establish a protocol data unit session between the test network and the at least one user equipment,
   wherein the test network or the at least one user equipment includes circuitry configured to release at least one radio resource control connection of the protocol data unit session between the test network and the at least one user equipment once at least one release condition is met such that an activation state of the protocol data unit session is altered,
   wherein the test system further comprises a control device coupled to the test network, the control device include circuitry configured to resume the protocol data unit session between the test network and the at least one user equipment based on a resuming signal such that the activation state of the protocol data unit session is modifiable, and wherein the protocol data session is resumable based on all protocol data unit sessions being stored within a layer structure of the test network subsequent to the respective protocol data unit sessions being established once.

12. The test system according to claim 11, wherein the test network includes circuitry configured to establish the at least one radio resource control connection between the at least one user equipment and the test network upon registering the at least one user equipment with the test network.

13. The test system according to claim 11, wherein the test network includes circuitry configured to establish at least one radio bearer in view of the at least one radio resource control connection between the test network and the at least one user equipment upon establishing the protocol data unit session between the test network and the at least one user equipment, wherein the test network and the at least one user equipment include circuitry configured to release the at least one radio bearer when releasing the at least one radio resource control connection between the test network and the at least one user equipment, and wherein the control device includes circuitry configured to recover the at least one radio bearer based on the resuming signal.

14. The test system according to claim 11, wherein the control device includes circuitry configured to recover the at least one radio resource control connection based on the resuming signal.

15. The test system according to claim 11, wherein test network includes circuitry configured to establish the protocol data unit session between the at least one user equipment and at least one core network node of the test network via a non-access stratum.

16. The test system according to claim 11, wherein the control device includes circuitry configured to establish the test network.

17. The test system according to claim 11, wherein the control device has at least one human-machine-interface that is configured to receive a user input.

18. The test system according to claim 17, wherein the control device includes circuitry configured to initiate the resuming signal based on the user input received via the at least one human-machine-interface.

19. The test system according to claim 17, wherein the at least one human-machine-interface comprises at least one button, at least one graphical user interface, at least one screen, or at least one standard commands for programmable instruments interface for receiving the user input.

20. A method for tailoring an activation state of a protocol data unit session between a test network and at least one user equipment, wherein the method comprises:

registering the at least one user equipment with the test network, establishing the protocol data unit session between the test network and the at least one user equipment, and resuming the protocol data unit session between the test network and the at least one user equipment after at least one radio resource control connection of the protocol data unit session between the test network and the at least one user equipment was released once at least one release condition was met, wherein the resuming is based on a resuming signal provided by a control device coupled to the test network such that an activation state of the protocol data unit session is modifiable, wherein the protocol data unit session is artificially reactivatable by the resuming signal of the control device.

* * * * *